United States Patent
Rachlin

(10) Patent No.: US 10,069,949 B2
(45) Date of Patent: Sep. 4, 2018

(54) SYSTEM AND METHOD FOR ENABLING DETECTION OF MESSAGES HAVING PREVIOUSLY TRANSITED NETWORK DEVICES IN SUPPORT OF LOOP DETECTION

(71) Applicant: Honeywell International Inc., Morris Plains, NJ (US)

(72) Inventor: Elliott Rachlin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 96 days.

(21) Appl. No.: 15/294,506

(22) Filed: Oct. 14, 2016

(65) Prior Publication Data

US 2018/0109654 A1 Apr. 19, 2018

(51) Int. Cl.
| | |
|---|---|
| *H04L 29/06* | (2006.01) |
| *H04L 12/46* | (2006.01) |
| *H04L 12/26* | (2006.01) |
| *H04L 12/833* | (2013.01) |
| *H04L 12/823* | (2013.01) |

(52) U.S. Cl.
CPC ............... *H04L 69/22* (2013.01); *H04L 12/46* (2013.01); *H04L 43/065* (2013.01); *H04L 43/0817* (2013.01); *H04L 47/31* (2013.01); *H04L 47/32* (2013.01)

(58) Field of Classification Search
CPC ....... H04L 69/22; H04L 12/46; H04L 43/065; H04L 43/0817; H04L 47/31; H04L 47/32
USPC .......................................................... 370/249
See application file for complete search history.

(56) References Cited

U.S. PATENT DOCUMENTS

| | | |
|---|---|---|
| 4,644,456 A | 2/1987 | Lydell |
| 5,220,653 A | 6/1993 | Miro |
| 5,630,128 A | 5/1997 | Farrell et al. |
| 5,970,236 A | 10/1999 | Galloway et al. |
| 6,442,634 B2 | 8/2002 | Bronson et al. |
| 6,519,605 B1 | 2/2003 | Gilgen et al. |
| 6,779,182 B1 | 8/2004 | Zolnowsky |
| 7,047,321 B1 | 5/2006 | Endo |

(Continued)

FOREIGN PATENT DOCUMENTS

EP    0488501 A2    6/1992

OTHER PUBLICATIONS

Elliott Rachlin, "Apparatus and Method for Managing a Plurality of Threads in an Operating System," U.S. Appl. No. 14/622,465, filed Feb. 13, 2015, 31 pages.

(Continued)

Primary Examiner — Stephen J Clawson
(74) Attorney, Agent, or Firm — Anthony Miologos

(57) ABSTRACT

A method includes receiving a message having a message header at a network node, where the message header includes a source address field. The method also includes determining whether the message has been previously received at the network node using one or more bits of the source address field. The method further includes, upon a determination that the message has not been previously received at the network node, setting the one or more bits of the source address field to a specified value indicating that the message has been received at the network node. The one or more bits in the source address field are used in a manner that is contrary to original device specifications.

17 Claims, 6 Drawing Sheets

(56) References Cited

U.S. PATENT DOCUMENTS

| | | |
|---|---|---|
| 7,234,139 B1 | 6/2007 | Feinberg |
| 7,565,631 B1 | 7/2009 | Banerjee et al. |
| 7,590,982 B1 | 9/2009 | Weissman |
| 7,748,001 B2 | 6/2010 | Burns et al. |
| 8,635,621 B2 | 1/2014 | Levitan et al. |
| 2001/0021177 A1* | 9/2001 | Ishii .................. H04L 45/02 370/256 |
| 2002/0176371 A1* | 11/2002 | Behzadi ............. H04L 45/02 370/254 |
| 2003/0016624 A1* | 1/2003 | Bare ................ H04L 29/12009 370/217 |
| 2004/0073910 A1 | 4/2004 | Hokenek et al. |
| 2004/0172631 A1 | 9/2004 | Howard |
| 2005/0216635 A1 | 9/2005 | Nishimura |
| 2006/0059485 A1 | 3/2006 | Onufryk et al. |
| 2006/0075404 A1 | 4/2006 | Rosu et al. |
| 2006/0184946 A1 | 8/2006 | Bishop et al. |
| 2007/0091793 A1* | 4/2007 | Filsfils ............... H04L 12/4633 370/228 |
| 2007/0198980 A1 | 8/2007 | Kwon |
| 2008/0028197 A1 | 1/2008 | Sawai |
| 2009/0138682 A1 | 5/2009 | Capps, Jr. et al. |
| 2009/0238080 A1* | 9/2009 | Hirano ............... H04L 12/4633 370/241 |
| 2010/0077399 A1 | 3/2010 | Plondke et al. |
| 2010/0229179 A1 | 9/2010 | Moore et al. |
| 2011/0302588 A1 | 12/2011 | Cornwell et al. |
| 2012/0023502 A1 | 1/2012 | Marr |
| 2013/0111489 A1 | 5/2013 | Glew et al. |
| 2013/0170504 A1* | 7/2013 | Shimokawa ........... H04L 47/56 370/429 |
| 2014/0019710 A1 | 1/2014 | Kataoka et al. |
| 2014/0164662 A1 | 6/2014 | van Schaik |
| 2014/0282507 A1 | 9/2014 | Plondke et al. |
| 2014/0310723 A1 | 10/2014 | Yamauchi et al. |
| 2014/0373021 A1 | 12/2014 | Teixeira et al. |
| 2015/0135183 A1 | 5/2015 | Kipp |
| 2016/0065407 A1* | 3/2016 | Saltsidis ............. H04L 41/0806 370/255 |
| 2016/0217197 A1 | 7/2016 | Rachlin |
| 2016/0239345 A1 | 8/2016 | Rachlin |

OTHER PUBLICATIONS

Elliott Rachlin, "System and Method for Endian Correction of Complex Data Structures in Heterogeneous Systems", U.S. Appl. No. 14/604,346, filed Jan. 23, 2015, 47 pages.

Elliott Rachlin, et al., "System and Method for Data Compatibility across Heterogeneous Machine Architectures", U.S. Appl. No. 15/164,724, filed May 25, 2016, 27 pages.

Elliott Rachlin, et al., "Relay Mechanism to Facilitate Processor Communication with Inaccessible Input/Output (I/0) Device", U.S. Appl. No. 15/017,422, filed Feb. 5, 2016, 31 pages.

Elliott Rachlin, System and Method for Preserving Value and Extending Life of Legacy Software in Face of Processor Unavailability, Rising Processor Costs, or other Issues, U.S. Appl. No. 15/017,467, filed Feb. 5, 2016, 34 pages.

Elliott Rachlin, "System and Method for Capturing and Displaying Packets and Other Messages in Local Control Network (LCN)", U.S. Appl. No. 15/009,544, filed Jan. 28, 2016, 2016, 23 pages.

Elliott Rachlin, et al., "Replication of Memory Image for Efficient Simultaneous Uses," U.S. Appl. No. 15/045,947, filed Feb. 17, 2016, 27 pages.

Ananthapadmanabha Krishnamurthy, et al., "System and Method for Legacy Level 1 Controller Virtualization," U.S. Appl. No. 15/824,497, filed Jun. 14, 2016, 30 pages.

"Packet analyzer," Wikipedia, Jan. 14, 2016, 4 pages.

Elliott Rachlin, et al., "System and Method for Facilitating Dynamic Remapping of Absolute Addresses during Software Migration," U.S. Appl. No. 15/176,108, filed Jun. 7, 2016, 30 pages.

Partial European Search Report dated Aug. 17, 2016 in connection with European Patent Application No. EP 16 15 1386.

Office Action dated Sep. 1, 2016 in connection with U.S. Appl. No. 14/622,465.

Extended European Search Report issued for EP 16154359.0 dated Jun. 23, 2016, 7 pages.

* cited by examiner

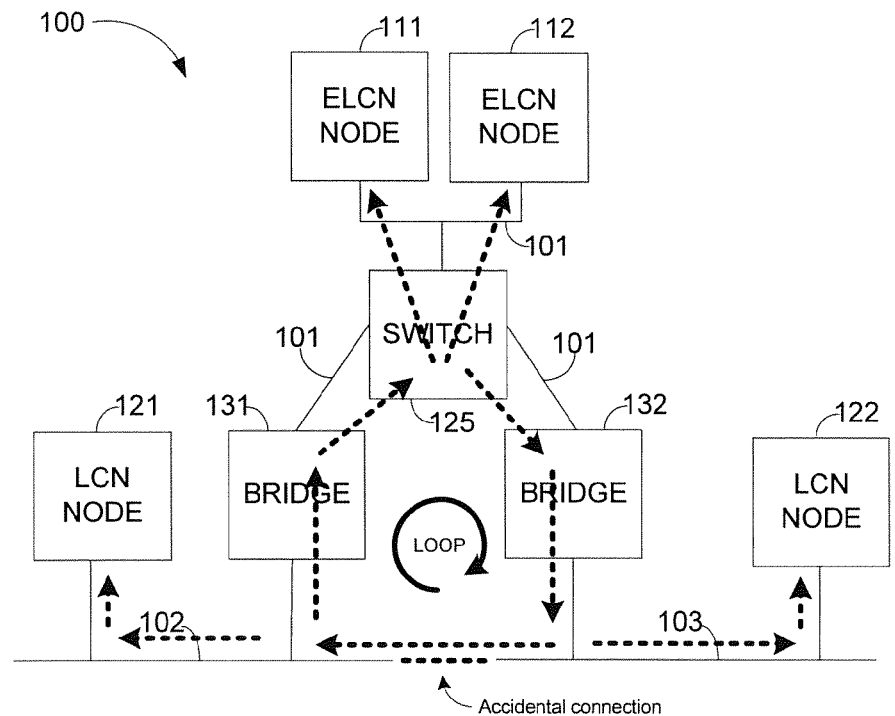
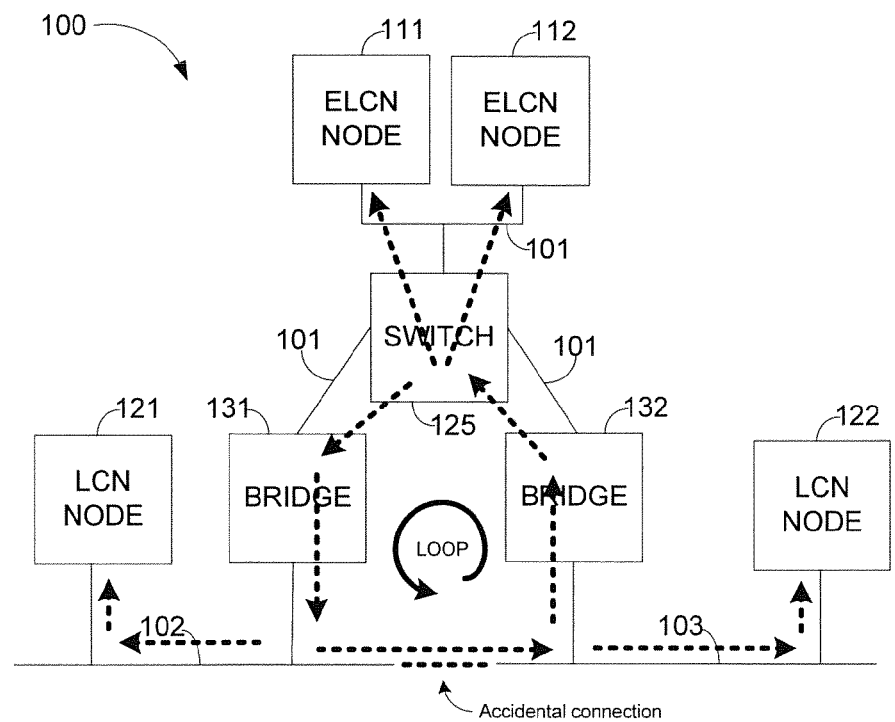
FIG. 2

Standard LCN Message Header

311 →

| | |
|---|---|
| $9A13 | Destination Address Including Physical, Logical, or Broadcast Command Structure |
| $4031 | Source Address Including Physical, Logical, or Broadcast Command Structure |
| $7F28 | Packet Type ($7F → Data_Packet) and Delivery Class ($28 → $DC_DA_Parameter_Access) |
| $0A9E | Total Message Size (2718 words) |
| $0423 | Packet Size (1000+59 words, from a "large channel" message buffer) |
| $B5A9 | Message ID (node-specific, wraps at 65535) |
| $0103 | Packet Sequence Number and Last Packet Sequence Number (1 of 3) |
| $0258 | OS Version (R600) |

SYSTEM AND METHOD FOR ENABLING DETECTION OF MESSAGES HAVING PREVIOUSLY TRANSITED NETWORK DEVICES IN SUPPORT OF LOOP DETECTION

TECHNICAL FIELD

This disclosure relates generally to computing and communication networks. More specifically, this disclosure relates to a system and method for enabling detection of messages having previously transited network devices in support of loop detection.

BACKGROUND

Control networks are often used in an industrial process control and automation system to connect various devices in the system, such as controllers, sensors, actuators, and the like. These devices are sometimes generically referred to as nodes. In some systems, older and newer control network technologies can be used together. For example, some systems include both HONEYWELL TDC3000 Local Control Networks (LCNs) and Fault Tolerant Ethernet (FTE) based HONEYWELL EXPERION Local Control Networks (ELCNs). When LCNs and ELCNs are connected together in complex ways, it is possible to inadvertently create network loops that can cause transmitted messages to loop indefinitely, which can quickly overwhelm the system.

SUMMARY

This disclosure provides a system and method for enabling detection of messages having previously transited network devices in support of loop detection.

In a first embodiment, a method includes receiving a message having a message header at a network node, where the message header includes a source address field. The method also includes determining whether the message has been previously received at the network node using one or more bits of the source address field. The method further includes, upon a determination that the message has not been previously received at the network node, setting the one or more bits of the source address field to a specified value indicating that the message has been received at the network node.

In a second embodiment, an apparatus includes at least one network interface and at least one processing device. The at least one network interface is configured to receive and transmit data over at least one network. The at least one processing device is configured to receive a message having a message header, where the message header includes a source address field. The at least one processing device is also configured to determine whether the message has been previously received using one or more bits of the source address field. The at least one processing device is further configured, upon a determination that the message has not been previously received, to set the one or more bits of the source address field to a specified value indicating that the message has been received.

In a third embodiment, a non-transitory computer readable medium contains instructions that, when executed by at least one processing device of a network node, cause the at least one processing device to receive a message having a message header, where the message header includes a source address field. The medium also contains instructions that, when executed by the at least one processing device, cause the at least one processing device to determine whether the message has been previously received at the network node using one or more bits of the source address field. The medium further contains instructions that, when executed by the at least one processing device, cause the at least one processing device, upon a determination that the message has not been previously received at the network node, to set the one or more bits of the source address field to a specified value indicating that the message has been received at the network node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 2 illustrates example loop conditions that can occur in the system of FIG. 1 according to this disclosure;

FIG. 4 illustrates an example format of a message header according to this disclosure;

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, in some industrial process control and automation systems, older and newer control network technologies can be used together. For example, some systems include both legacy HONEYWELL Local Control Networks (LCNs) and newer HONEYWELL EXPERION Local Control Networks (ELCNs). This may occur, for example, when a system is incrementally migrating from an LCN-based system to an ELCN-based system so that nodes of both types are used within the system.

Figure 1:
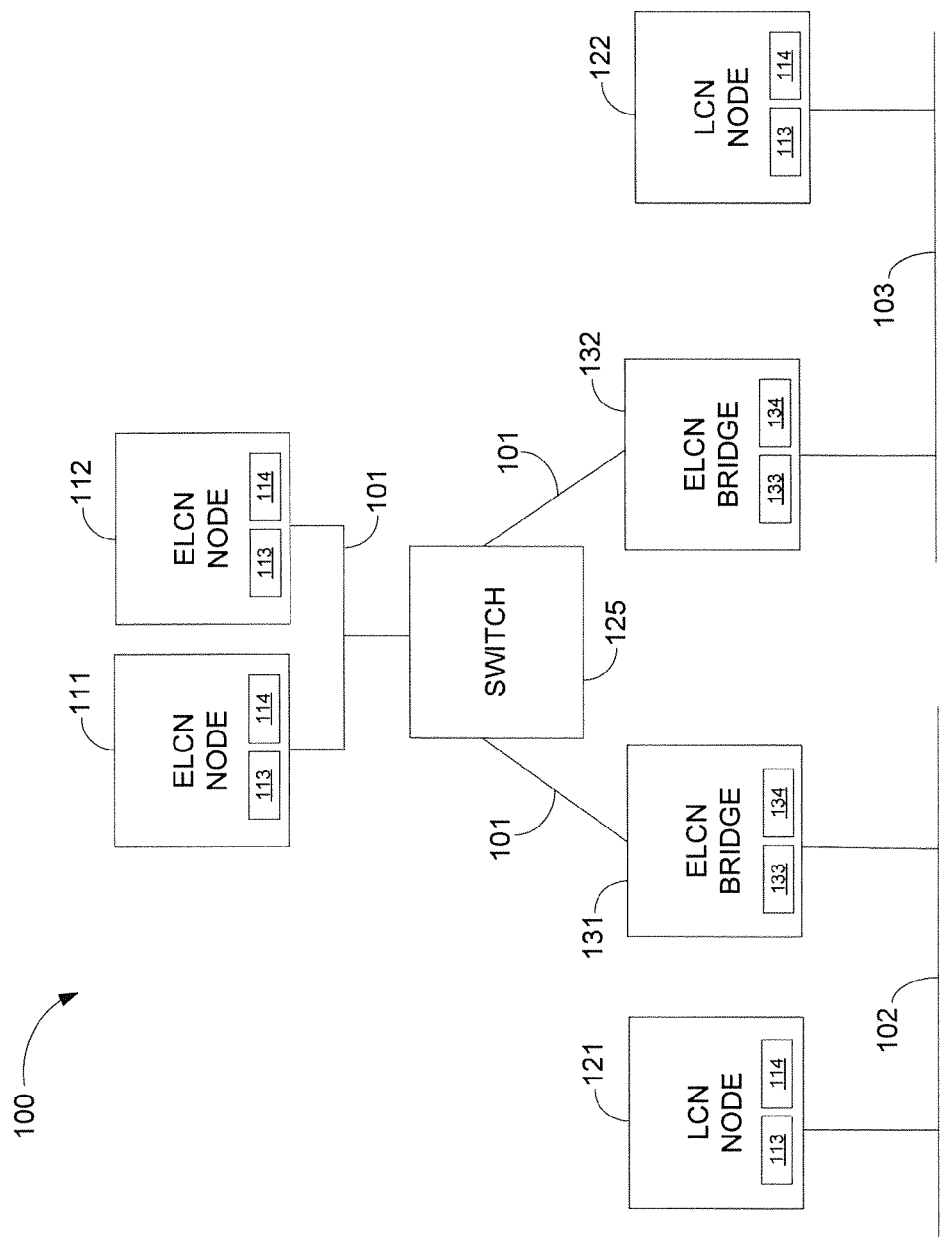
FIG. 1 illustrates an example system that includes multiple types of networks according to this disclosure.

FIG. 1 illustrates an example system 100 that includes multiple types of networks according to this disclosure. In this particular example, the multiple types of networks include LCN and ELCN networks. However, this disclosure is not limited to use with LCN and ELCN networks, and the system 100 could include any other or additional types of networks.

As shown in FIG. 1, the system 100 includes a first network 101, a second network 102, and a third network 103. In this example, the network 101 represents an ELCN and includes a number of nodes such as ELCN nodes 111-112. Also, in this example, the networks 102-103 represent legacy LCNs, each of which includes a number of nodes such as an LCN node 121 and an LCN node 122.

In this example embodiment, the system 100 can represent all or a portion of an industrial process control and automation system. For example, one or more of the nodes 111-112, 121-122 can include one or more industrial process controllers configured to control process elements in a process or production system that may perform any of a wide variety of functions. As a particular example, the nodes 111-112, 121-122 could be configured to provide control signals to process elements or equipment used to manufacture chemical, pharmaceutical, paper, or petrochemical products. As another particular example, the nodes 111-112, 121-122 can include one or more operator stations configured for user access and control of the process control and automation system.

Each node 111-112, 121-122 includes any suitable structure for performing one or more functions in a process or production system or other system. The nodes 111-112, 121-122 could, for example, include one or more processing devices 113 and one or more memories 114 storing instructions and data used, collected, or generated by the processing device(s) 113. In particular embodiments, one or more of the nodes 111-112, 121-122 could represent personal computers executing a MICROSOFT WINDOWS operating system or other operating system.

The nodes 111-112, 121-122 are coupled to each other and to other components of the system 100 through the networks 101-103. Each network 101-103 represents any network or combination of networks facilitating communication between components in the system 100. In this example, a switch 125 routes communicated information being transported between the networks 101-103. The switch 125 represents any suitable structure for performing routing or switching functions in a network environment. While FIG. 1 shows only one switch 125, the system 100 can include multiple switches 125 arranged in different configurations.

As explained above, the nodes 111-112 represent a different type of node than the nodes 121-122. Specifically, the nodes 111-112 are ELCN nodes, and the nodes 121-122 are LCN nodes. Although LCN nodes and ELCN nodes share many characteristics, there are differences in communication protocols between LCN nodes and ELCN nodes, such as different parameters, formats, and the like.

To help ensure communication compatibility between the ELCN nodes 111-112 and the LCN nodes 121-122, the system 100 includes ELCN bridges 131-132 disposed between the ELCN nodes 111-112 and the LCN nodes 121-122. The ELCN bridges 131-132 operate as media converters that convert messages from an ELCN protocol to an LCN protocol and vice versa (or between any other suitable protocols). The ELCN bridges 131-132 also perform message forwarding, message filtering (such as discarding invalid messages), and rate limiting (such as disallowing messages from moving too fast from one network to another since ELCN networks are typically much faster than LCN networks). Each of the ELCN bridges 131-132 can include one or more processing devices 133 and one or more memories 134 storing instructions and data used, collected, or generated by the processing device(s) 133, such as software executed by the ELCN bridges 131-132. In particular embodiments, the ELCN bridges 131-132 could represent desktop computers or servers executing a MICROSOFT WINDOWS, LINUX, or other operating system.

When LCNs and ELCNs are connected together in complex ways, it is possible to inadvertently create loops within the overall network. Loops may allow transmitted LCN messages to propagate indefinitely without ever being removed from the network. This can quickly overwhelm the network. Networks including only LCNs or only ELCNs are not subject to such loops due to native loop prevention safeguards in each type of network. In contrast, a heterogeneous network having both LCNs and ELCNs prevents native LCN or ELCN loop prevention safeguards from preventing a loop that crosses both types of network.

FIG. 2 illustrates example loop conditions that can occur in the system 100 of FIG. 1 according to this disclosure. In particular, FIG. 2 illustrates two loop conditions that can occur in the system 100 when the network 102 is accidentally connected to the network 103, such as by a network engineer connecting an LCN cable between network routers or LCN nodes. As indicated by the arrows, LCN messages can move indefinitely in a clockwise loop, a counter-clockwise loop, or both directions simultaneously through the ELCN bridges 131-132 due to the improper connection between the network 102 and the network 103.

To address these or other types of message looping problems, it is possible to mark LCN messages as having once transited a connecting device so that any second attempt to do so is detected and inhibited. That is, an LCN message can be marked to indicate that the message has passed through a particular node. If the same LCN message attempts to pass through the same node a second time, the node can detect the marking and prevent the message from passing a second or subsequent time. Since message loops include at least one ELCN bridge 131-132 in the loop path, the ELCN bridge 131-132 is a very suitable place to mark an LCN message.

In accordance with this disclosure, the ELCN bridges 131-132 are configured to mark an LCN message, detect a marking on an LCN message, and prevent the LCN message from transiting if a marking is detected in order to prevent a message loop. For example, the ELCN bridges 131-132 may include one or more algorithms or software routines executed by the processing device(s) 133 to mark an LCN message header and read an LCN message header to detect a marking. Further details regarding this functionality are provided below.

Although FIG. 1 illustrates one example of a system 100 that includes multiple types of networks, various changes may be made to FIG. 1. For example, components could be added, omitted, combined, or placed in any other configuration according to particular needs. Also, while described as representing all or a portion of a process control and automation system, the system 100 could be used in any other manner. In addition, FIG. 1 illustrates one example operational environment in which messages having previously transited network devices can be detected. This functionality could be used in any other device or system (whether or not related to industrial process control) and with any other or additional communication protocols. Although FIG. 2 illustrates examples of loop conditions that can occur in the system 100 of FIG. 1, various changes may be made to FIG. 2. For instance, the loops shown in FIG. 2 are examples only, and other types of loops could be formed in various ways.

Figure 3:
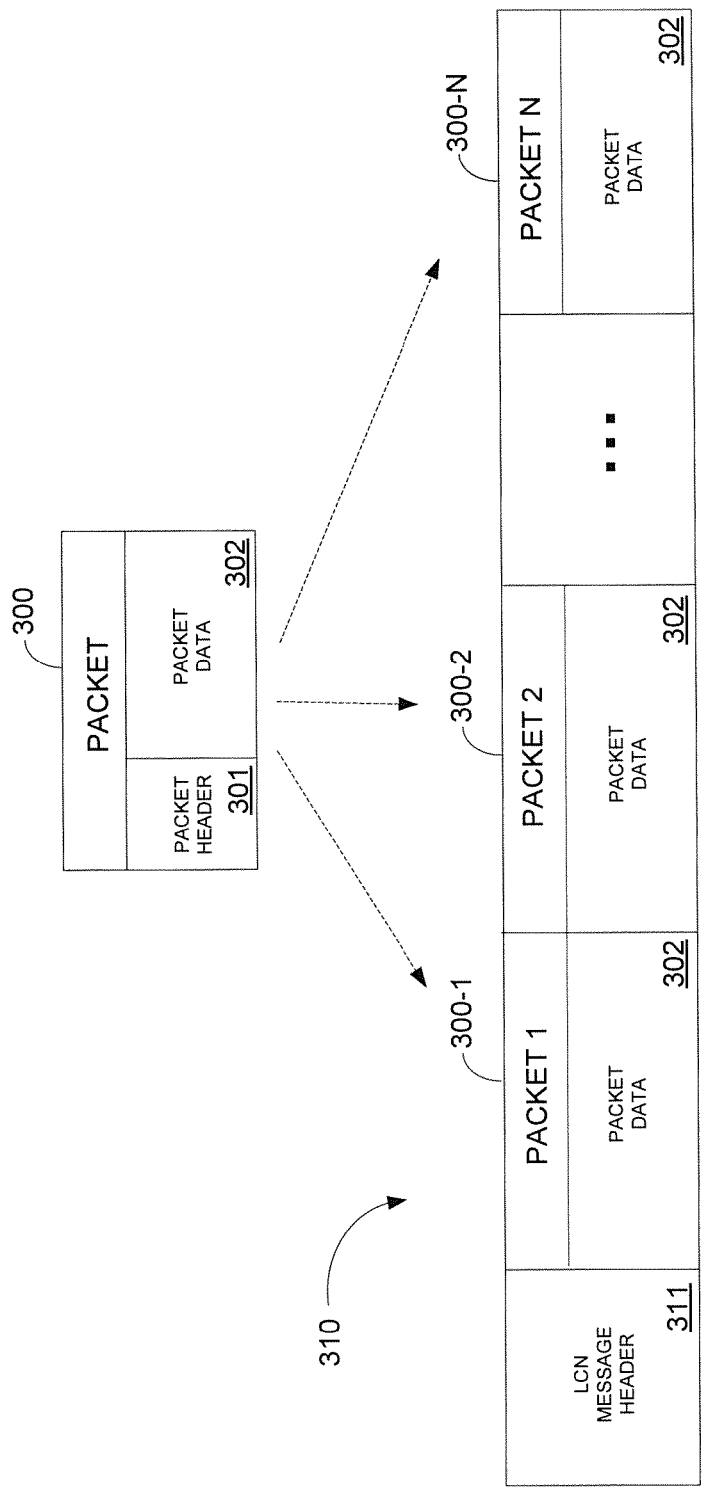
FIG. 3 illustrates an example communication packet and an example communication message according to this disclosure.

FIG. 3 illustrates an example communication packet 300 and an example communication message 310 according to this disclosure. In particular, FIG. 3 illustrates an example LCN packet 300 and an example LCN message 310. The packet 300 is a fundamental unit for carrying data in both LCNs and ELCNs. A packet 300 includes a packet header 301 and packet data 302. An LCN message 310 includes an LCN message header 311 and the packet data from one or more packets 300-1 through 300-N. Each packet 300-1 through 300-N in the LCN message 310 represents one instance of the packet 300. When the individual packets 300 are assembled together to create the LCN message 310, the packet header 301 of the first packet 300-1 in the LCN message 310 is formatted into the LCN message header 311. Each subsequent packet 300-2 through 300-N in the LCN message 310 is stripped of its packet header 301 so that its packet data may be used in the LCN message 310.

As described in more detail below, one or more bits in the LCN message header 311 can be used as a marking to show that the LCN message 310 has traversed a particular network node, such as an ELCN bridge 131-132. This marking can be used to later detect if the same LCN message 310 is received at the same network node.

Although FIG. 3 illustrates one example of a communication packet 300 and one example of a communication message 310, various changes may be made to FIG. 3. For example, since the functionality of this patent document is not limited to use with LCNs and ELCNs, any other suitable packet or message formats could be supported by the network nodes.

FIG. 4 illustrates an example format of a message header 311 according to this disclosure. In particular, FIG. 4 illustrates a standard format of an LCN message header 311. The LCN message header 311 here includes multiple fields, including a destination address 401, a source address 402, a packet type 403, a total message size 404, a packet size 405, a message identifier (ID) 406, a packet sequence number 407, and an operating system (OS) version 408. The format can be defined according to at least one device functional specification (DFS), such as a DFS of the HONEYWELL TDC3000 LCN architecture. This format is used for LCN messages 310 in both ELCNs and LCNs.

The destination address 401 and the source address 402 are two-byte words that include sixteen bits in total. The value of the destination address 401 and the source address 402 indicate one of three different types of addresses for the message destination or source: physical (referring to an actual physical address of one computing device), logical (referring to a group address shared by one or more receiving devices), or broadcast (referring to a message sent to all receivers). Both addresses 401-402 may have a value indicating a broadcast, logical, or physical address.

Different rules in the DFS define valid values of the destination address 401 and the source address 402 in accordance with the three types of address. For example, with a broadcast address type, the value of the destination address 401 or the source address 402 is $5000 (where '$' represents hexadecimal notation). That is, the first digit of the destination address 401 or the source address 402 is a five and all other digits are zero, or the address 401-402 is considered an illegal address. With a physical address type, the format of the destination address 401 or the source address 402 is $40xx or $60xx. That is, the first digit of the destination address 401 or the source address 402 is a four or six, the second digit is a zero, and xx is a number that refers to a computing device or node in the system. For instance, in FIG. 4, the source address 402 is $4031, where $40 indicates that the address is a physical address and $31 specifies the originating node as $31 (or 49 in decimal). With a logical address type, the valid formats of the destination address 401 or the source address 402 can be $1xxx, $2xxx, $3xxx, or $7xxx. That is, the first digit is a one, two, three, or seven, and xxx is a number that refers to a logical group of computing devices or nodes.

Turning again to loop detection, the format of the LCN message 310 as shown in FIG. 3 does not appear to avail itself to use of an indicator, such as a one-bit flag, to mark the LCN message 310. For example, each packet 300-1 through 300-N has a defined format and does not include any space for an extra bit or reuse of an existing bit for a new purpose without needing to reprogram software that interacts with the LCN message 310. Likewise, as shown in FIG. 4, the format of the LCN message header 311 is defined to include the fields 401-408, and the bits in each field 401-408 are used for a particular purpose according to the applicable DFS. Any new bits or reuse of existing bits for a new purpose would appear to require reprogramming of related software.

Thus, on the face of it, there appears to be no available space in an LCN message 310 into which a record may be stored of the LCN message 310 having previously transited a connecting device. Moreover, a new field cannot be added to the LCN message 310 due to backwards compatibility and reprogramming requirements. In accordance with this disclosure, however, it is possible to "repurpose" one or more bits in an LCN message 310 such that message looping can be detected (and inhibited) while normal messaging operations are not disturbed.

In reviewing the LCN message header 311, it can be seen that the destination address 401 can be (and often is) populated with any one of a physical address, a logical address, or a broadcast address. Both broadcast addresses and logical addresses may require all sixteen available bits in the destination address 401 due to their format requirement. Thus, the destination address 401 does not appear to be a suitable candidate for repurposing one or more bits. However, while functionally supporting any of the three forms of addressing (broadcast, logical, and physical), the source address 402 in practice typically has a value representing a physical address and never has a value representing a broadcast or logical address. This is a software convention of the TDC3000 control system rather than a hardware restriction.

Moreover, despite the rules in the DFS that state that physical addresses are to be in the format of $40xx or $60xx, the various software functions that receive, populate, or update the source address 402 often do not care if the second half of the first byte of the two-byte source address 402 is non-zero if the first half is $4 or $6. Stated differently, the physical address format for the source address 402 does not have to be $40xx or $60xx. Instead, the format can be $4yxx or $6yxx, where y is ignored and xx is a number that refers to a computing device or node.

For ease of explanation, this can also be considered in binary notation. For example, consider a source address 402 that has a physical address value of the format $40xx. Written in binary, this becomes:

0100 0000 XXXX XXXX.

The first four bits "0100" specify physical addressing, and the last eight bits "XXXX XXXX" specify the return address of computing device or node.

Although the DFS indicates that the "0000" bits in the first byte are zero, these bits are not actually used by software to determine the source address 402 and can be implemented for a different purpose. Thus, the format of the source address 402 can be considered as:

0100 BBBB XXXX XXXX.

In this format, the four "B" bits of the source address 402 are functionally unused to determine a physical address.

In accordance with specific embodiments of this disclosure, one or more of the four "B" bits can be used by an ELCN bridge 131-132 or other device to mark an LCN message 310 as having gone through the ELCN bridge 131-132 previously. The ELCN bridge 131-132 can subsequently detect the LCN message 310 if the LCN message 310 transits the ELCN bridge 131-132 a second or subsequent time. In one embodiment, the format of the source address 402 can be redefined as:

0100 SSUD XXXX XXXX where:
"0010"=address format specifying physical address;
"U"=LCN message has gone up through the ELCN bridge;
"D"=LCN message has gone down through the ELCN bridge;
"S"=Spare bits for future use;
"XXXX XXXX"=Physical address of sending node.

Thus, according to the new format, an ELCN bridge 131-132 can use two bits "U" and "D" of the source address 402 in the LCN message header 311 to mark an LCN message 310 as having transited the ELCN bridge 131-132 in either direction. In this context, "up through the ELCN bridge" means that the LCN message 310 has transited from an LCN to an ELCN, and "down through the ELCN bridge" means that the LCN message has transited from an ELCN to an LCN. For example, the ELCN bridge 131 can set the "U" bit of the source address 402 to a binary value of one when an LCN message 310 transits from the LCN node 121 through the ELCN bridge 131 to the ELCN node 111. Similarly, the ELCN bridge 132 can set the "D" bit of the source address 402 to a binary value of one when an LCN message 310 transits from the ELCN node 111 through the ELCN bridge 132 to the LCN node 122.

Of course, the use of "U," "D," "up through the ELCN bridge," "down through the ELCN bridge," and a binary "one" are merely examples of how the marking could be formatted, defined, and implemented. Other values, names, and bit arrangements could be used within the scope of this disclosure. For example, in other embodiments, only one bit may be used to indicate a transiting of an ELCN bridge regardless of direction. As another example, a binary value of zero (instead of a binary value of one) could be used to indicate a previously transited LCN message.

The "U" and "D" bits (or other markings) of an LCN message 310 can be inspected by an ELCN bridge 131-132 when the LCN message 310 arrives at the ELCN bridge 131-132. This allows the ELCN bridge 131-132 to detect messages that are attempting to transit the ELCN bridge 131-132 for a second time. When a previously marked LCN message 310 is detected (such as when the ELCN bridge 131-132 identifies a binary value of one in either the "U" bit or the "D" bit), any one or more of the following actions can occur:

The duplicate looping LCN message 310 is discarded.
The ELCN bridge 131-132 sends a notification (such as to an operator station) that a loop error has been detected.
The ELCN bridge 131-132 enters a "detected loop" mode in which one or more ELCN bridges 131-132 in the "detected loop" mode continue to pass messages, and one or more ELCN bridges 131-132 in the "detected loop" mode stop passing messages.

The marking approach described here has been tested and successfully detects loops, which can then be automatically and quickly broken to eliminate the loops. No negative effects may occur from using the marking bits in the source address 402 of the LCN message header 311, even though the marking bits are being used in a manner that is contrary to one or more DFSs associated with the LCN message header 311.

Although FIG. 4 illustrates one example format of a message header, various changes may be made to FIG. 4. For example, since the functionality of this patent document is not limited to use with LCNs and ELCNs, any other suitable message header could be supported by the network nodes. Also, the sizes and values of the fields described above could vary as needed or desired.

Figure 5:
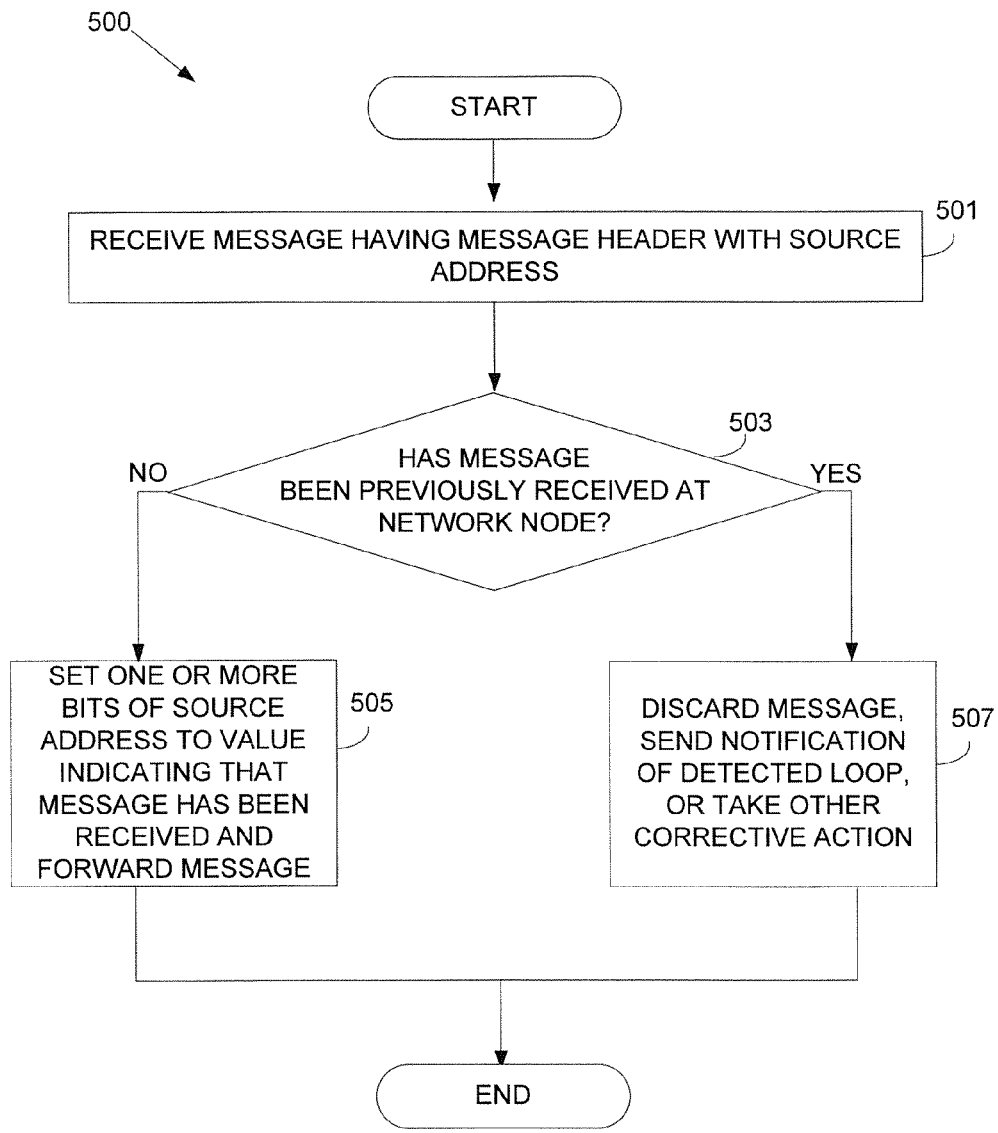
FIG. 5 illustrates an example method for marking and detecting messages that have previously transited network devices in order to support loop detection according to this disclosure.

FIG. 5 illustrates an example method 500 for marking and detecting messages that have previously transited network devices in order to support loop detection according to this disclosure. For ease of explanation, the method 500 is described as being performed using either or both ELCN bridges 131-132 of FIG. 1. However, the method 500 could be used with any suitable device or system. Also, as noted above, protocols other than those used for LCN and ELCN could be supported.

At step 501, a message having a message header is received, where the message header includes a source address field. This may include, for example, the ELCN bridge 131-132 receiving an LCN message 310 that includes an LCN message header 311. The LCN message header 311 includes a source address 402.

At step 503, a determination is made whether the message has been previously received at a network node. This may include, for example, the ELCN bridge 131-132 determining whether the LCN message 310 has been previously received at the ELCN bridge 131-132 by parsing a value of one or more bits of the source address 402. Parsing one or more bits of the source address 402 may include determining a value of the "D" bit, determining a value of the "U" bit, or determining a value of both bits according to the redefined format for the source address 402.

If the message has not been previously received at the network node, at step 505, one or more bits of the source address field are set to a specified value indicating that the message has been received at the network node, and the message is forwarded or otherwise transmitted. This may include, for example, the ELCN bridge 131-132 setting the "D" bit, the "U" bit, or both bits to a value that indicate that the LCN message 310 has been received at the ELCN bridge 131-132. This may also include the ELCN bridge 131-132 forwarding the modified message up or down within the larger system 100.

If the message has been previously received at the network node, at step 507, at least one form of corrective action occurs. This may include, for example, the ELCN bridge 131-132 discarding the LCN message 310, sending a notification that a loop has been detected, or performing another suitable operation.

Although FIG. 5 illustrates one example of a method 500 for marking and detecting messages that have previously transited network devices, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs. In addition, while the method 500 is described with respect to the system 100, the method 500 may be used in conjunction with other types of devices and systems (which need not relate to industrial process control).

Figure 6:
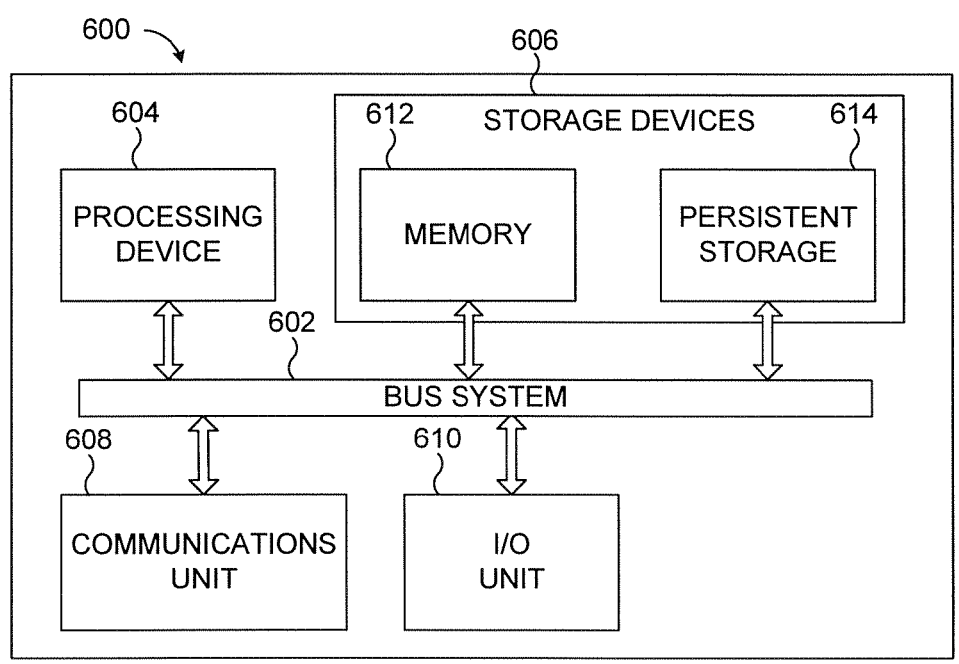
FIG. 6 illustrates an example device for marking and detecting messages that have previously transited network devices in order to support loop detection according to this disclosure.

FIG. 6 illustrates an example device 600 for marking and detecting messages that have previously transited network devices in order to support loop detection according to this disclosure. The device 600 could, for example, represent a computing device in the system 100 of FIG. 1, such as one of the ELCN bridges 131-132. The device 600 could represent any other suitable device for marking and detecting messages that have previously transited network devices in order to support loop detection.

As shown in FIG. 6, the device 600 can include a bus system 602, which supports communication between at least one processing device 604, at least one storage device 606, at least one communications unit 608, and at least one input/output (I/O) unit 610. The processing device 604 executes instructions that may be loaded into a memory 612. The processing device 604 may include any suitable number(s) and type(s) of processors or other devices in any suitable arrangement. Example types of processing devices 604 include microprocessors, microcontrollers, digital signal processors, field programmable gate arrays, application specific integrated circuits, and discrete circuitry.

The memory 612 and a persistent storage 614 are examples of storage devices 606, which represent any structure(s) capable of storing and facilitating retrieval of information (such as data, program code, and/or other suitable information on a temporary or permanent basis). The memory 612 may represent a random access memory or any other suitable volatile or non-volatile storage device(s). The persistent storage 614 may contain one or more components or devices supporting longer-term storage of data, such as a ready only memory, hard drive, Flash memory, or optical disc. In accordance with this disclosure, the memory 612 and the persistent storage 614 may be configured to store instructions associated with marking and detecting messages that have previously transited network devices.

The communications unit 608 supports communications with other systems, devices, or networks, such as the networks 101-103. For example, the communications unit 608 could include a network interface that facilitates communications over at least one Ethernet network, LCN, or ELCN. The communications unit 608 could also include a wireless transceiver facilitating communications over at least one wireless network. The communications unit 608 may support communications through any suitable physical or wireless communication link(s).

The I/O unit 610 allows for input and output of data. For example, the I/O unit 610 may provide a connection for user input through a keyboard, mouse, keypad, touchscreen, or other suitable input device. The I/O unit 610 may also send output to a display, printer, or other suitable output device.

Although FIG. 6 illustrates one example of a device 600 for marking and detecting messages that have previously transited network devices in order to support loop detection, various changes may be made to FIG. 6. For example, various components in FIG. 6 could be combined, further subdivided, or omitted and additional components could be added according to particular needs. Also, computing devices can come in a wide variety of configurations, and FIG. 6 does not limit this disclosure to any particular configuration of device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    receiving a message comprising a message header at a network node, the message header comprising a source address field;
    determining whether the message has been previously received at the network node using one or more bits of the source address field;
    upon a determination that the message has not been previously received at the network node, setting the one or more bits of the source address field to a specified value indicating that the message has been received at the network node; and upon a determination that the message has been previously received at the network node, at least one of:
discarding the message; and
sending a notification that a loop has been detected.

2. The method of claim 1, wherein determining whether the message has been previously received at the network node comprises:
determining a value of a first bit of the source address field indicating whether the message has previously transited the network node in a first direction; and
determining a value of a second bit of the source address field indicating whether the message has previously transited the network node in a second direction opposite the first direction.

3. The method of claim 2, wherein:
the source address field comprises a sequence of sixteen bits; and
the first and second bits are among fifth through eighth bits in the sequence.

4. The method of claim 1, wherein determining whether the message has been previously received at the network node comprises:
determining a value of a bit of the source address field indicating whether the message has transited the network node in any direction.

5. The method of claim 1, wherein:
the one or more bits are expected to have a predetermined value according to a device functional specification (DFS); and
the specified value conflicts with the predetermined value of the DFS.

6. The method of claim 1, wherein the network node comprises a bridge configured to couple different types of networks.

7. An apparatus comprising:
at least one network interface configured to receive and transmit data over at least one network; and
at least one processing device configured to:
receive a message comprising a message header, the message header comprising a source address field;
determine whether the message has been previously received using one or more bits of the source address field;
upon a determination that the message has not been previously received, to set the one or more bits of the source address field to a specified value indicating that the message has been received; and
upon a determination that the message has been previously received, at least one of:
discard the message; and
send a notification that a loop has been detected.

8. The apparatus of claim 7, wherein, to determine whether the message has been previously received, the at least one processing device is configured to:
determine a value of a first bit of the source address field indicating whether the message has previously transited the apparatus in a first direction; and
determine a value of a second bit of the source address field indicating whether the message has previously transited the apparatus in a second direction opposite the first direction.

9. The apparatus of claim 8, wherein:
the source address field comprises a sequence of sixteen bits; and the first and second bits are among fifth through eighth bits in the sequence.

10. The apparatus of claim 7, wherein, to determine whether the message has been previously received, the at least one processing device is configured to:
determine a value of a bit of the source address field indicating whether the message has transited the apparatus in any direction.

11. The apparatus of claim 7, wherein:
the one or more bits are expected to have a predetermined value according to a device functional specification (DFS); and
the specified value conflicts with the predetermined value of the DFS.

12. The apparatus of claim 7, wherein the apparatus comprises a bridge configured to couple different types of networks.

13. A non-transitory computer readable medium containing instructions that, when executed by at least one processing device of a network node, cause the at least one processing device to:
receive a message comprising a message header, the message header comprising a source address field;
determine whether the message has been previously received at the network node using one or more bits of the source address field;
upon a determination that the message has not been previously received at the network node, set the one or more bits of the source address field to a specified value indicating that the message has been received at the network node; and
upon a determination that the message has been previously received, at least one of:
discard the message; and
send a notification that a loop has been detected.

14. The non-transitory computer readable medium of claim 13, wherein the instructions that cause the at least one processing device to determine whether the message has been previously received comprise instructions that cause the at least one processing device to:
determine a value of a first bit of the source address field indicating whether the message has previously transited the network node in a first direction; and
determine a value of a second bit of the source address field indicating whether the message has previously transited the network node in a second direction opposite the first direction.

15. The non-transitory computer readable medium of claim 14, wherein:
the source address field comprises a sequence of sixteen bits; and
the first and second bits are among fifth through eighth bits in the sequence.

16. The non-transitory computer readable medium of claim 13, wherein the instructions that cause the at least one processing device to determine whether the message has been previously received comprise instructions that cause the at least one processing device to:
determine a value of a bit of the source address field indicating whether the message has transited the network node in any direction.

17. The non-transitory computer readable medium of claim 13, wherein:
the one or more bits are expected to have a predetermined value according to a device functional specification (DFS); and the specified value conflicts with the predetermined value of the DFS.

* * * * *